June 27, 1933.  F. ALLENDORFF  1,915,712
ELECTRICAL MACHINE
Filed Oct. 10, 1931

Inventor
Fritz Allendorff
by Steward & McKay
his attorneys

Patented June 27, 1933

1,915,712

UNITED STATES PATENT OFFICE

FRITZ ALLENDORFF, OF STUTTGART, GERMANY, ASSIGNOR TO ROBERT BOSCH AKTIENGESELLSCHAFT, OF STUTTGART, GERMANY

ELECTRICAL MACHINE

Application filed October 10, 1931, Serial No. 568,164, and in Germany October 17, 1930.

The present invention relates to electrical machine more especially dynamos for use with power vehicles, the object being to provide for ventilation of the machine and also its protection against dust. It particularly relates to a caping device which functions to protect the interior of the machine against the penetration of dust, and at the same time allows water of condensation collecting in the machine to pass out therefrom.

According to the present invention, at least one opening is arranged in the casing or in the protective cap at the lowest part of the machine, such opening being covered by a liquid-absorbent material, such as felt.

An example of construction of the present invention is shown in the accompanying drawing, in which:—

Figure 1:
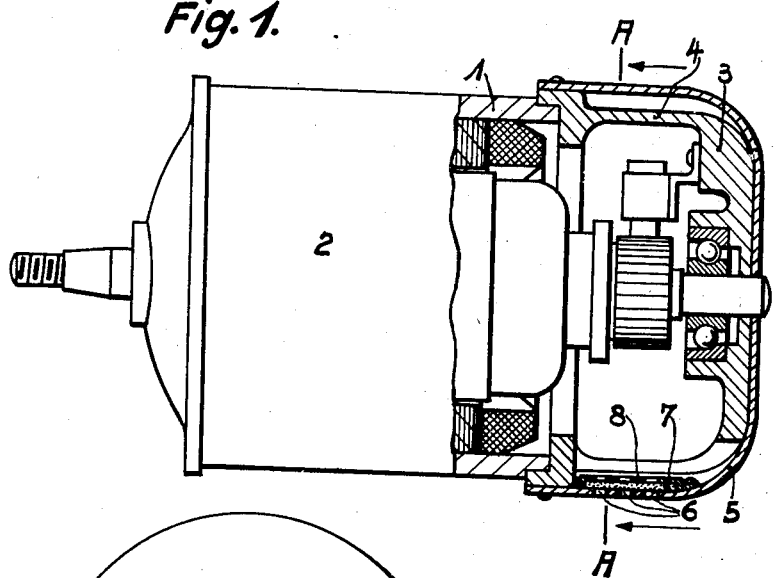
Figure 2:
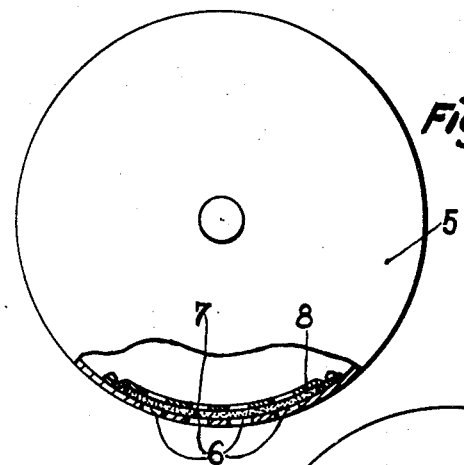

Figure 1 is a view of a dynamo partly in section,

Figure 2 a section through the dust-cap on the line A—A of Fig. 1.

Figure 3:
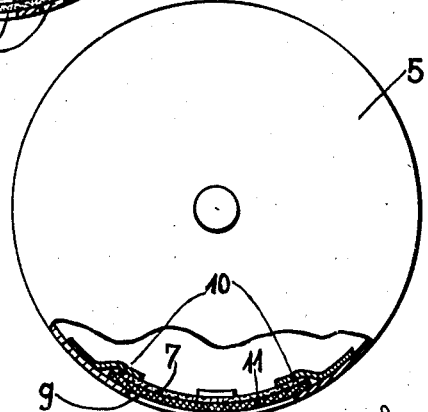

Figure 3 shows a modified form of construction of dust cap.

On the casing 1 of the dynamo 2 is secured a bearing cap or cover 3 which is provided with several arms 4 so arranged that none of them is positioned at the lowest part of the machine. A protective cap 5 is pushed over the bearing cap or cover 3 and is secured thereto. In the construction according to Figure 1 the cap 5 is provided on its lower side with several relatively small openings 6, above which a sheet of felt 7 is laid. The felt sheet is retained in its position by a perforated sheet metal plate 8, which is riveted to the sheet metal cap 5.

In the construction according to Figure 3, a single and larger opening 9 is stamped out of the protective cap 5. Lugs 10 are provided on the inner side of the cap at the edge of the opening, below which lugs a felt sheet 7 and a fine meshed wire netting 11 are inserted. This construction permits the packing material to be quickly changed.

I declare that what I claim is:

1. An electrical machine including a casing housing operating parts of said machine, the lowermost portion of which casing is cut away to form at least one hole therein exposing said operating parts within said casing to atmosphere, a sheet of liquid absorbing material covering said hole in said casing and means to retain said sheet in position shrouding said hole.

2. A dust excluder for electrical machines comprising the combination, with an electrical machine, of a cap rigidly secured to the machine and in free communication with an interior portion thereof, the lowermost portion of which cap is cut away to form an aperture therein exposing the interior of said cap to atmosphere, a strip of liquid absorbing material shrouding said aperture between said cap and said machine and means for retaining said strip in position shrouding said aperture.

3. A dust excluder for electrical machines comprising the combination, with an electrical machine, of an outer casing secured to the machine and in free communication with an interior portion thereof, said casing being cut away on its lower face to form a plurality of perforations exposing the interior of said casing to atmosphere, a sheet of liquid absorbing material placed above said perforations to shroud the same and a perforated sheet above said liquid absorbing materital adapted to retain said material in position above the perforations in said casing.

4. An electrical machine including a casing housing operating parts of said machine, the lowermost portion of which casing is cut away to form an aperture exposing the interior of said casing to atmosphere, a sheet of liquid absorbing material shrouding said aperture in said casing, a wire gauze of fine mesh laid upon said sheet of liquid absorbing material and a number of lugs on the inner periphery of said casing adapted to retain said wire gauze and said sheet of liquid absorbing material in position shrouding said aperture.

5. An electrical machine including a casing housing operating parts of said machine, the lowermost portion of which casing is cut away to form on aperture exposing the interior of said casing to atmosphere, a sheet of felt shrouding said aperture in said casing, a wire gauze of fine mesh laid upon said sheet of felt and a number of lugs on the inner periphery of said casing adapted to retain said wire gauge and said sheet of felt in position shrouding said aperture.

In testimony whereof I have hereunto affixed my signature.

FRITZ ALLENDORFF.